United States Patent [19]
Stoll

[11] 3,735,249
[45] May 22, 1973

[54] SPOKED ELECTRODE FOR MONITORING EARTH CURRENTS

[75] Inventor: Donald F. Stoll, Vernal, Utah

[73] Assignee: El Paso Natural Gas Company, El Paso, Tex.

[22] Filed: July 1, 1971

[21] Appl. No.: 158,869

[52] U.S. Cl. ..........................324/9, 324/29, 324/72
[51] Int. Cl. ..................................................G01v 3/08
[58] Field of Search..............................324/9, 72, 29

[56] References Cited

UNITED STATES PATENTS

| | | |
|---|---|---|
| 2,974,276 | 3/1961 | Davis....................................324/9 X |
| 2,192,404 | 3/1940 | Jakosky................................324/9 X |
| 3,361,957 | 1/1968 | Hings....................................324/9 X |

Primary Examiner—Gerard R. Strecker
Attorney—Bacon & Thomas

[57] ABSTRACT

A monitoring device for use in measuring earth potentials, including a hub carried by a handle unit and having a plurality of spokes extending therefrom. Each spoke has an electrolytic solution cell on its outer end, into which a spoke-mounted electrode extends. The outer end of the cell has a porous tip mounted thereon, which is wetted by the solution and engages the earth. The spokes and the hub are made of conductive material, and a brush-type electrical pickup on the handle unit engages the hub for transmitting signals detected by the wetted porous tips as they progressively engage the earth when the device is rolled along.

8 Claims, 5 Drawing Figures

Patented May 22, 1973
3,735,249
2 Sheets-Sheet 1
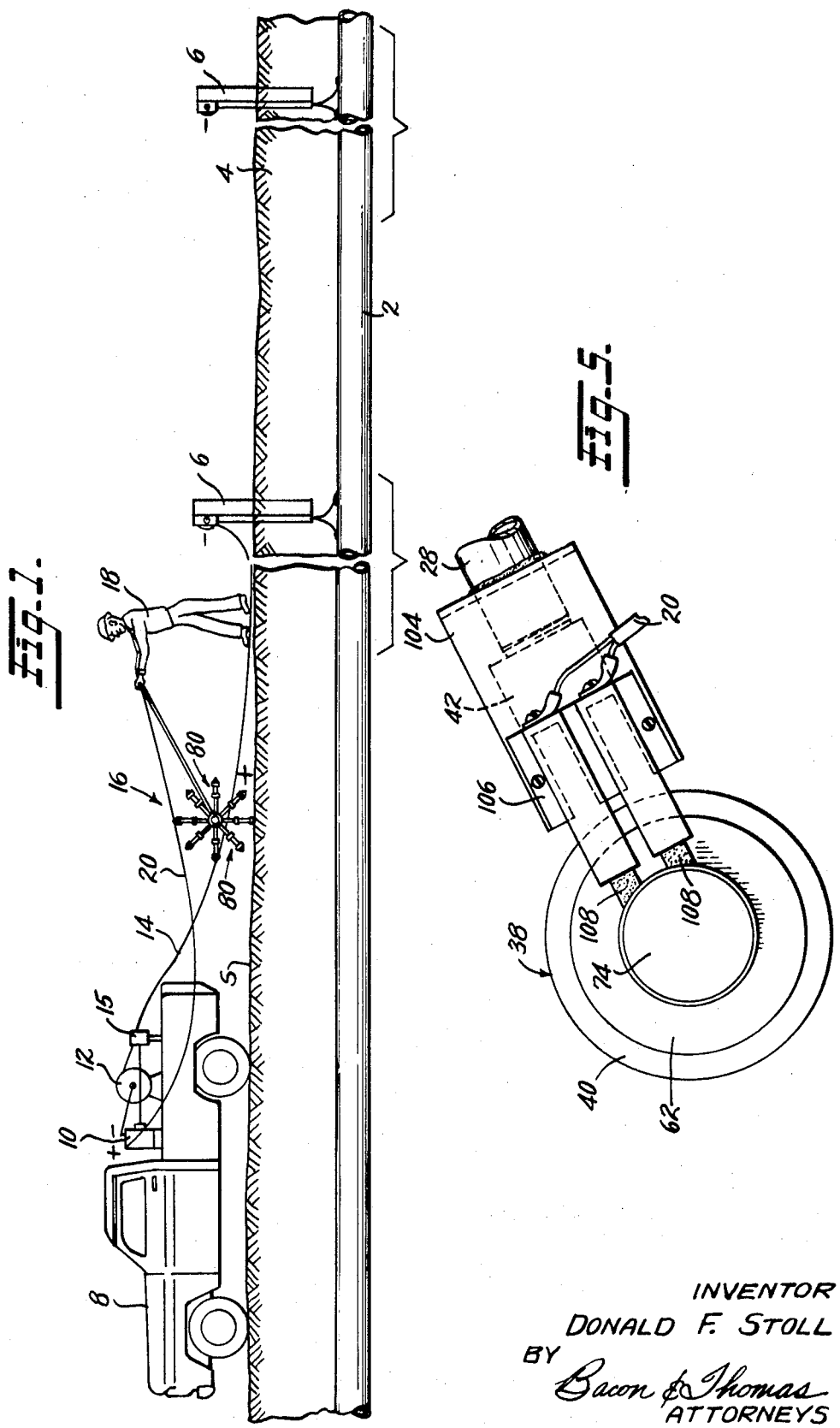
INVENTOR
DONALD F. STOLL
BY
Bacon & Thomas
ATTORNEYS Patented May 22, 1973 3,735,249
2 Sheets-Sheet 2
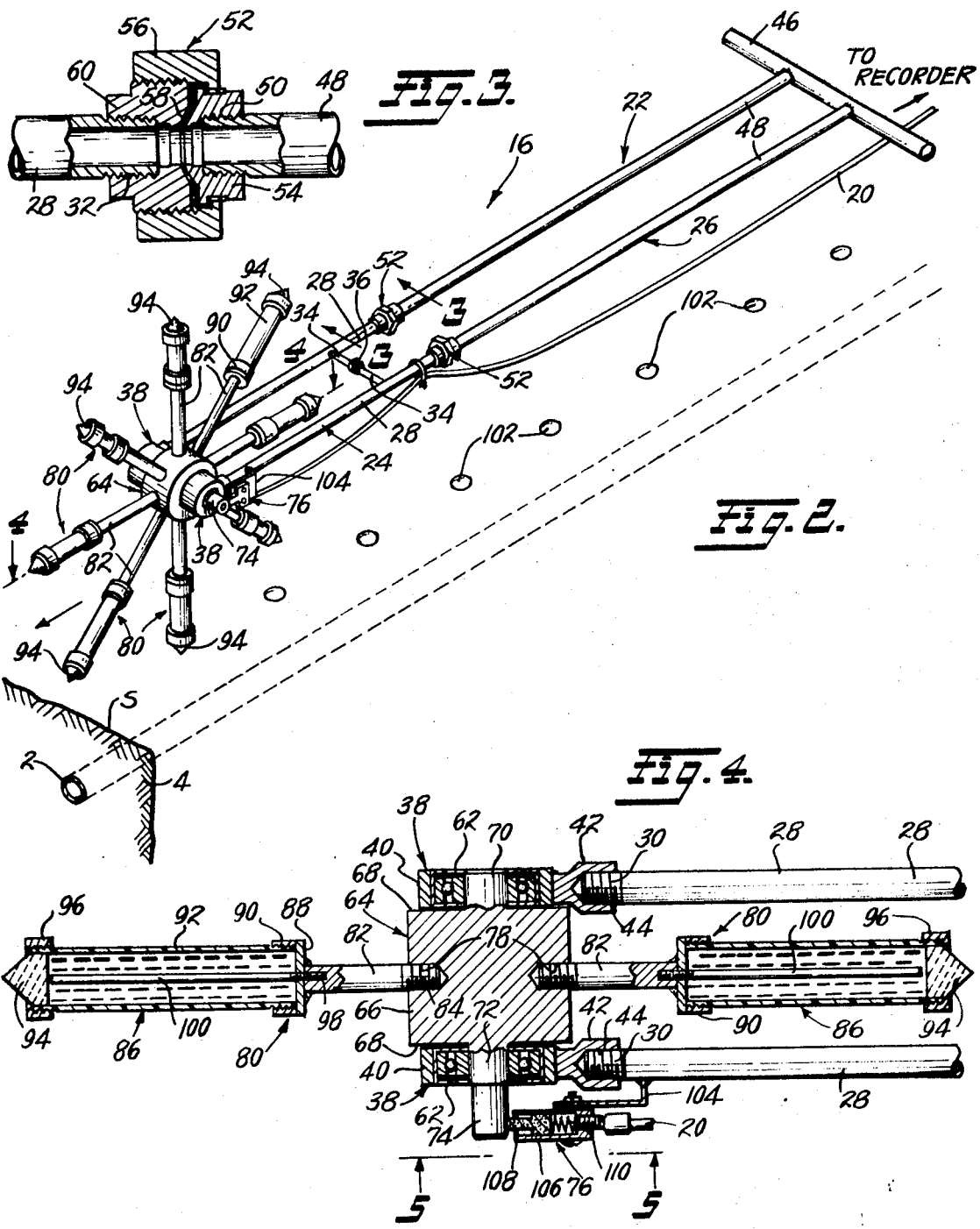
INVENTOR
DONALD F. STOLL
BY Bacon & Thomas
ATTORNEYS

3,735,249

SPOKED ELECTRODE FOR MONITORING EARTH CURRENTS

BACKGROUND OF THE INVENTION

1. Field of the Invention

The present invention relates generally to apparatus for making earth potential surveys, and more particularly to a novel monitoring device designed to make contact with the soil and detect voltage between an underground structure and the earth.

2. Description of the Prior Art

Earth potential surveys are commonly made in connection with the maintenance of buried pipelines, cables and other underground structures; and are conducted by contacting a detector device with the earth, sending a current through the underground structure, and then measuring the earth potential at the point of contact. By plotting the measured potentials on a graph a record is made that will give an experienced interpreter information about chemical corrosion and other factors affecting the buried structure.

In order to obtain meaningful information, the earth potential must be measured at many locations along the buried structure. This can be done by manually inserting and removing a single electrode repeatedly along the length of the survey, but such is obviously a very laborious task. Thus, there have been suggestions for a better monitoring method.

One monitoring device that has been proposed is to use a wheel with a continuous rim that is rolled on the earth, the rim being an electrode, and being connected to transmit detected signals to the recording equipment. It is difficult with such a wheel to obtain effective contact with the earth in all instances, however, and skipping or sliding of the wheel can result in errors in the potential vs location graph that is produced. In an effort to overcome this problem with such continuous rim wheels, trenchs have been dug along the path to be surveyed, and have been wetted down with water. While this procedure gives improved results, it is again laborious, and destructive of farm crops and other overgrowth.

Difficulties have also been encountered with such continuous rim wheel monitoring devices, in devising effective means to pick up and transmit signals detected by the rim. There is thus need for an improved monitoring device, one that can be easily moved along an earth path with but a minimum of advance preparation, and which can with accuracy produce the information needed to complete an accurate survey graph. The present invention is directed toward satisfying that need.

SUMMARY OF THE INVENTION

The spoked monitoring device of the present invention is designed to be manually pushed or rolled along a path to be surveyed, although it can be easily adapted for mounting on a tractor or the like. The device includes a handle unit, comprised of a base portion connected with a handle portion so as to be electrically isolated therefrom.

A hub made of electrically conductive material is rotatably mounted on the base portion of the handle unit, and has a plurality of radially projecting spokes extending therefrom, each made of an electrically conductive material. Mounted on the end of each spoke is a cylindrical container or cell for receiving an electrolytic solution, and an electrode rod is mounted on each spoke and extends into its associated cell to be immersed in the solution contained therein. A pointed tip made of porous ceramic material is mounted on the outer end of each cell, and is arranged to be wetted by the electrolytic solution whenever the spoke is pointing downwardly.

The present monitoring device is rolled along the ground much like a wheel, with the wetted porous ceramic tips progressively engaging and digging into the earth. As each tip engages the earth any detected potential signal is transmitted through the electrolytic solution to the rod electrode immersed therein, and from said electrode to the electrically conductive hub through the electrically conductive spoke. A brush-type electrical pickup is carried by the base portion of the handle unit, and engages the hub for picking up the potential signal. A transmission line connects the pickup to the recording equipment.

The present device can be used with minimum preparation of the earth path, since the wetted and pointed porous tips on the ends of the spokes will easily penetrate through the average ground cover to make firm contact with the earth. Further, the spoke arrangement substantially eliminates skipping or sliding, thereby assuring an accurate potential vs location graph. The electrolytic solution in each container or cell is replenished when needed, and a minimum of repair or replacement of parts is required.

It is a principal object of the present invention to provide a monitoring device for use in making earth potential surveys that can be used with a minimum of preparation of the earth paths, and which will reliably detect earth potential signals and accurately relate them to the position where detected.

Another object is to provide a monitoring device with a minimum of moving elements, and which can be easily repaired and maintained.

Other objects and many of the attendant advantages of the invention will become readily understood from the following Description of the Preferred Embodiment, when taken together with the accompanying drawings.

BRIEF DESCRIPTION OF THE DRAWINGS

FIG. 1 is a diagramatic view of the apparatus for making an earth potential survey in connection with a buried pipeline, and shows the present spoked monitoring device being moved along by an operator;

FIG. 2 is a perspective view of the spoked monitoring device of the invention,

FIG. 3 is an enlarged, partially broken away view, taken on the line 3—3 of FIG. 2, showing details of one of the insulated connectors for joining the handle with the base portion of the handle unit;

FIG. 4 is an enlarged, fragmentary horizontal sectional view taken along the line 4—4 in FIG. 2, showing details of the monitoring device; and FIG. 5 is an enlarged, fragmentary elevational view of the electrical pickup, taken along the line 5—5 in FIG. 4.

DESCRIPTION OF THE PREFERRED EMBODIMENT

Referring now to the drawings, a pipeline is indicated at 2 in FIG. 1, buried in the earth 4 and having spaced monitoring stations 6 therealong. It is to be understood for purposes of the invention that the pipeline 2 might instead be a cable or some other buried structure, and that such will normally run for many miles across the earth.

A buried structure such as the pipeline 2 should be periodically maintained if proper functioning thereof is to be assured, and in order to do proper maintenance, information about the condition of the structure must be collected and analyzed. One analysis tool that has been found useful is an earth potential survey, wherein a graph is made of the earth potential along an underground structure vs its length. FIG. 1 shows the apparatus for making such a survey along the buried pipeline 2.

In FIG. 1 an equipment vehicle 8 carries a recording voltmeter 10, a reel 12 containing a cable 14 that measures about a mile in length, and a counter 15. The counter 15 is connected to the recording voltmeter 10, and drives the recording graph of the voltmeter as the cable 14 is payed out. In use the vehicle 8 is first positioned near one of the monitoring stations 2, and the free end of the cable 14 is connected to the station for transmitting a signal current to the underground structure 2. The vehicle is then driven slowly along the path of the structure 2, paying out the cable 14, and thereby operating the recording graph of the voltmeter 10.

Positioned behind the slowly moving vehicle 8 is the spoked electrode monitoring device 16 of the invention, such being guided manually by an operator 18. The device 16 functions to detect the earth potential as it is moved along the surface S of the earth 4 over the underground structure 2, and transmits such signal to the recording voltmeter 10 by a transmission line 20. The voltmeter 10 then makes a graph of earth potential vs location for the underground structure 2.

The spoked monitoring device 16 includes a handle unit 22, comprised of a base or bracket portion 24 and a handle portion 26. The base portion 24 includes a pair of parallel tubes 28 threaded at their lower and upper ends 30 and 32, respectively, the tubes 28 having confronting, normally projecting nipples 34 welded thereto near their upper ends 32 that are connected by a pipe union 36 to detachably mount said tubes 28 in parallel relationship. The lower ends 30 of the tubes 28 have brackets 38 mounted thereon, each bracket 38 comprising a cylindrical collar 40 having a boss 42 thereon containing a threaded bore 44 for receiving one of the lower tube ends 30.

The handle portion 26 of the unit 22 includes a transversely disposed handlebar 46, to which the upper ends of a pair of parallel tubes 48 are welded. The spacing between the tubes 48 is the same as the spacing between the tubes 28, and the lower ends 50 of the former are externally threaded. The two portions 24 and 26 of the handle unit 22 are connected together by insulated unions 52, so that they are electrically isolated from each other.

The unions 52 are of conventional construction, and each includes a flanged, internally threaded nipple 54 that receives the threaded lower tube end 50, and which has a flanged thimble 56 received thereon. A cap 58 of electrical insulative material covers the front face and the flange of the nipple 54, and insulates the thimble 56 therefrom. An internally threaded connector nipple 60 is received on the threaded upper end 32 of each tube 28 and is threaded into the associated screw thimble 56, the cap 58 serving to insulate the nipples 54 and 60 from each other.

The cylindrical collars 40 of the brackets 38 contain sealed ball bearing units 62 which serve to mount a cylindrical hub 64. The hub 64 is made from an electrically conductive material such as brass, and includes an enlarged central portion 66 from the flat end faces 68 of which axially aligned short and long stub axles 70 and 72, respectively, project. The stub axles 70 and 72 are seated within the inner races of the bearing units 62 to rotatably mount the hub 64 on the handle unit 22, and the outer end 74 of the longer stub axle 72 projects beyond its associated bracket 38 to form an electrical contact rotor for an electrical brush-type pickup 76.

The hub 64 has a plurality of threaded radial bores 78 therein, equally spaced about the periphery thereof. Preferably, there are eight bores 78, and secured within each is a radially extending spoke unit 80, each including a spoke 82 made of electrically conductive material and threaded at its inner end 84. A cylindrical container or cell 86 is mounted on the outer end of each spoke 82, and includes a circular plate 88 secured to the outer end of the spoke 82 and carrying an internally threaded mounting collar 90 thereon. A cylindrical body 92 of nylon or plastic, and externally threaded at each end, is threaded into the mounting collar 90.

Mounted on the outer end of each cell 86 is a pointed tip 94 made of a suitable porous ceramic material, each tip 94 being secured to the threaded outer end of its associated cylindrical body 92 by a screw thimble 96. The plate 88 and the outer end of the spoke 82 on which it is carried have a threaded axial bore 98 therein, into which is threaded one end of an electrode rod 100 made of copper or other suitable conductive material. The electrode rod 100 extends for substantially the full length of the cylindrical cell body 92, and serves to establish electrical contact with an electrolytic solution contained in the cell.

In use, a suitable electrolytic solution such as copper sulphate is placed in each cell 86, by removing the screw thimble 96 and tip 94 to gain access to the interior thereof. With the tip 94 replaced and pointing downwardly, such will become wetted by the electrolytic solution. As the device 16 is rolled along the wetted tips 94 will progressively enter the earth 4 to form depressions 102, whereby firm contact with the earth is assured. Any earth potential signal detected will be transmitted from the tip 94 to the immersed electrode rod 100 by the electrolytic solution, and from the electrode rod 100 to the rotor shaft portion 74 by the electrically conductive spokes 82 and hub 64. The signal cannot be drained away through the handle unit 22 and the operator 18, because of the electrical isolation provided by the insulative unions 52.

The electrical pickup unit 76 picks up the detected signal from the rotor 74, and such is transmitted to the recording voltmeter 10 by the conductor 20. The pickup unit 76 is mounted on one of the tubes 28 by a bracket 104, and includes a housing 106 containing a pair of spaced carbon brushes 108 urged into contact with the rotor shaft position 74 by springs 110.

The monitoring device 16 is of rugged construction. However, should one of the ceramic tips 94 be broken, replacement thereof is an easy matter. The device has a minimum of components, and is therefor easy to service and maintain. In use, the spoke units 80 will positively dig into the earth to establish firm contact as the device is rolled along, and such can easily penetrate through the usual natural groundcover without at the same time destroying valuable crops. Thus, the invention satisfies all of the objects set forth hereabove.

While the monitoring device 16 is designed for manual operation, it is to be understood that the handle portion 26 could be eliminated, and that the base portion 24 might be mounted to a cart or some other vehicle, Obviously, many other variations and modifications of the invention are also possible.

I claim:

1. An electrode monitoring device for use in measuring earth potentials, comprising: a base; a hub rotatably carried by said base; a plurality of radial spokes carried by said hub,; each spoke carrying a cell for electrolyte solution and each cell having a tip of porous material adapted to be saturated with said solution and to make contact with the ground; an electrical pickup carried by said base; and conductor means for each cell arranged to contact the electrolyte solution in such cell and electrically connected to said pickup, whereby an electrical connection is established from each porous tip through the electrolyte solution in the respective cell to said pickup so that current flow in the earth detected by each saturated tip when such is engaged with the earth is passed from the tip to said pickup.

2. An electrode monitoring device as recited in claim 1, wherein said conductor means includes: an electrode carried by each spoke and received within each cell.

3. An electrode monitoring device as recited in claim 2, wherein said spokes and said hubs are made of electrically conductive material and the electrical connection between each said electrode and said pickup is through said spoke and hub.

4. An electrode monitoring device as recited in claim 1, further including a handle portion connected with said base portion.

5. An electrode monitoring device as recited in claim 4, wherein said handle portion is electrically insulated from said base portion.

6. An electrode monitoring device for use in measuring earth potentials, comprising: a base; a hub made of electrically conductive material, and including axially aligned axle portions on the opposite ends thereof, said axle portions being received within bearing means carried by said base to thereby mount said hub for rotation; a plurality of spokes projecting radially from said hub, and made of electrically conductive material; a cell for receiving an electrolytic liquid mounted on the outer end of each of said spokes and having a porous tip mounted thereon, said porous tips being arranged to be wetted by electrolytic liquid within said container and being engageable with the earth for establishing electrical contact therewith; an electrode connected with each of said spokes and extending into the cell mounted on said spoke for engaging said electrolytic liquid to thereby establish an electrical connection between said liquid and said hub made of electrically conductive material, whereby current flow in the earth detected by each wetted tip when such is engaged with the earth is passed from the tip to said hub; and electrical pickup means carried by said base and engaging said hub.

7. An electrode monitoring device as recited in claim 6, including additionally a handle connected to said base, and insulated therefrom.

8. An electrode monitoring device as recited in claim 6, wherein said pickup means includes at least one brush contact mounted on said base, and engagable with one of said hub axle portions.

* * * * *